United States Patent
Akiyama et al.

(10) Patent No.: US 6,722,944 B2
(45) Date of Patent: Apr. 20, 2004

(54) APPARATUS FOR AND METHOD OF ATTACHING A LENS HOLDER TO A SPECTACLE LENS, AND A METHOD FOR PRODUCING A LENS

(75) Inventors: Hisanori Akiyama, Shinjyuku-ku (JP); Masahiro Jinbo, Shinjyuku-ku (JP); Norihisa Tanaka, Shinjyuku-ku (JP); Masahiko Samukawa, Shinjyuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/984,319

(22) Filed: Oct. 29, 2001

(65) Prior Publication Data

US 2002/0052167 A1 May 2, 2002

(30) Foreign Application Priority Data

Oct. 31, 2000 (JP) ........................................ 2000-332680

(51) Int. Cl.⁷ ............................................... B24B 49/00
(52) U.S. Cl. ..................... 451/5; 451/8; 451/9; 451/10; 451/41
(58) Field of Search .............................. 451/5, 8, 9, 10, 451/41, 42, 43

(56) References Cited

U.S. PATENT DOCUMENTS

| | | | |
|---|---|---|---|
| 4,945,684 A | * | 8/1990 | Wada et al. .................. 451/11 |
| 5,867,259 A | | 2/1999 | Yanagi et al. |
| 6,012,965 A | * | 1/2000 | Savoie ........................ 451/384 |
| 6,099,383 A | * | 8/2000 | Mizuno et al. ............. 451/256 |
| 6,283,826 B1 | * | 9/2001 | Mizuno ........................... 451/5 |
| 6,328,628 B1 | * | 12/2001 | Mizuno et al. ............... 451/43 |
| 6,332,827 B1 | * | 12/2001 | Gottschald et al. .......... 451/41 |
| 6,336,057 B1 | * | 1/2002 | Obayashi ...................... 451/43 |
| 6,379,215 B1 | * | 4/2002 | Mizuno et al. ............. 451/255 |

FOREIGN PATENT DOCUMENTS

| | | |
|---|---|---|
| EP | 0 753 781 A2 | 1/1997 |
| EP | 0 876 874 A2 | 11/1998 |
| EP | 0 933 163 A1 | 8/1999 |
| EP | 1 149 664 A2 | 10/2001 |
| JP | 2-216428 | 8/1990 |
| JP | 11-216650 | 8/1998 |

OTHER PUBLICATIONS

European Search Report dated Feb. 3, 2003 for European Application No. EP 01 12 4457.

* cited by examiner

Primary Examiner—Joseph J. Hail, III
Assistant Examiner—Alvin J Grant
(74) Attorney, Agent, or Firm—Griffin & Szipl, PC

(57) ABSTRACT

An apparatus for and process of attaching a lens holder to an uncut lens for a spectacle lens which enables efficient attachment of the lens holder at a position without the processing interference when the lens holder is attached to a progressive multifocal lens or a multifocal lens. The lens holder can be attached to the uncut lens at a position set outside of a range of processing interference when the positions of hidden marks or an edge of a segment are obtained by inputting and processing an image of the uncut lens by the apparatus for image processing, the obtained positions of the hidden marks or the edge of the segment, data of the spectacle frame and lens holder buildup area shape are processed and the lens holder is attached to the uncut lens.

20 Claims, 7 Drawing Sheets

APPARATUS FOR AND METHOD OF ATTACHING A LENS HOLDER TO A SPECTACLE LENS, AND A METHOD FOR PRODUCING A LENS

BACKGROUND OF THE INVENTION

The present invention relates to an apparatus for and method of attaching a lens holder to an uncut lens for a spectacle lens. More particularly, the lens holder of the present invention comprises a jig attached to an uncut lens and is used as a central axis of rotation for the uncut lens in a process for grinding the edge of an uncut lens.

Typically, a spectacle glass is prepared first by processing an uncut spectacle lens (in general, a so-called round lens having a circular shape) into a shape to fit the shape of a spectacle frame, and then by fitting the cut lens into the spectacle frame. For such preparation of the spectacle glass, a layout must be conducted. A layout includes deciding the position of the optical center based on prescription data of the eye of the person who wears the spectacle glass (the dioptric power, the cylindrical dioptric power, the distance between the right and left eyes and other such data) and the spectacle frame shape data which depends on the type of frame selected by the person who wears the spectacle glass. The layout is conducted essentially by bringing the optical center (in the case of a single vision lens) or the eyepoint (in the case of a multifocal lens) of the spectacle lens in line with the position of the pupil center of the person who wears the spectacle glass when the prepared spectacle glass is worn by the person.

In general, when a person wears a spectacle glass having a spectacle frame selected by the person, it is rather rare that the geometrical center, with regard to the shape of the spectacle frame, and the pupil center of the person are at the same position on the lens. Moreover, when processing an uncut lens into a shape to fit the selected frame, the geometrical center of the shape formed by the processing (the shape of the spectacle frame) is typically brought in line with the position of the optical center of the lens. In other words, the uncut lens is processed so that these two positions are one and the same. As a result, a problem arises in that when worn, the wearer's pupil center is not placed in line with either the position of the optical center (or the eyepoint) of the spectacle lens once the spectacle glass is completed by fitting the processed lens into the spectacle frame to be worn. It is therefore necessary that the optical center (or the eyepoint as the case may be moved from the position of the geometrical center and brought in line with the position of the pupil center.

When the layout is complete, an uncut lens (a prescribed lens) which satisfies the conditions for the above layout and prescription for the wearer and is suitable for processing is selected and processed. Processing of the uncut lens is conducted by using an apparatus for processing a lens which grinds edge portions of the uncut lens by a grinder or a cutter while the uncut lens is rotated around a specific axis approximately perpendicular to the optical face of the uncut lens. To process the uncut lens by the apparatus for processing a lens, a lens holder comprising a jig is used as the rotational center axis of the uncut lens and is attached to the uncut lens in advance.

Heretofore, the lens holder is attached at the position of the optical center in the case of a single-vision lens. In the case of a progressive multifocal lens or a multifocal lens (in general, a bifocal lens), the lens holder is attached at the position of the eyepoint of the lens. One example of an apparatus for attaching the lens holder at the position of the eyepoint, is the apparatus described in Japanese Patent Application Laid-Open No. Heisei 11(1999)-216650, hereby incorporated herein by reference.

When the apparatus described in Japanese Patent Application Laid-Open No. Heisei 11(1999)-216650 is used, images of hidden marks are observed by projecting an image of an uncut lens onto a screen and the position of the eyepoint is obtained from the positions of the hidden marks. Then, the position of the uncut lens is decided by moving the uncut lens so that the eyepoint is brought to the position of the center of a cross reticle on the screen showing the reference position of the apparatus for attaching a lens holder, and the lens holder is attached at the decided position.

SUMMARY OF THE INVENTION

However, it has been recently found that, when spectacle frames having some types of shapes are used, the uncut lens cannot be processed in accordance with the method of attaching a lens holder at the optical center (or eyepoint). As the fashion preference of persons who wear spectacle glasses diversifies, spectacle frames having shapes of very small size in the vertical direction are occasionally used. When a spectacle frame has a vertical size smaller than a specific value and a lens holder is attached to the optical center, processing interference takes place. In other words, a portion of the outer periphery of the lens holder comes outside the shape of the spectacle frame (the shape to be formed by the processing). Therefore, the processing becomes impossible. The result is a certain range of processing interference, i.e., a range wherein a portion of the lens holder extends beyond the shape of the spectacle frame while attached to the lens so as to hinder processing of the lens. The result of this overextension (also defined herein as buildup, and more specifically lens holder completed spectacle lens buildup) is processing interference.

It is an object of the present invention therefore to provide an apparatus for and method of attaching a lens holder to an uncut lens for a spectacle lens, which enables efficient obtaining of the position for attaching a lens holder, in order to eliminate processing interference.

This object and others are achieved in a first aspect of the present invention by providing a method for attaching a lens holder to an uncut lens for a spectacle lens, comprising: (1) providing a lens holder comprising a jig operably attached to an uncut lens and defining a central axis of rotation of the uncut lens in a process for grinding an edge of the uncut lens using an apparatus for processing spectacle lenses under numerical control based on processing data including spectacle frame shape data; (2) forming an image of the uncut lens by an apparatus for image processing and obtaining the positions of hidden marks and/or position of the edge of a segment of the uncut lens by processing the formed image; (3) obtaining a position outside the range of processing interference by information processing of i) data of the positions of the hidden marks or the position of the edge of the segment, ii) the spectacle frame shape data and iii) lens holder-lens buildup area shape data using a computer; and 4) designating the obtained position as a position for attaching the lens holder to the uncut lens and attaching the lens holder at the determined position, the range of a processing interference being a range where a portion of the lens holder extends beyond the shape of the spectacle frame so as to hinder processing of the uncut lens.

This object and others are achieved in a second aspect of the present invention by providing a method for attaching a lens holder to an uncut lens for a spectacle lens, comprising: (1) providing a lens holder comprising a jig which is attached to an uncut lens and used as a central axis of rotation of the uncut lens in a process for grinding an edge of the uncut lens using an apparatus for processing spectacle lenses under numerical control based on processing data including predetermined spectacle frame shape data; (2) fixing the uncut lens to a moving stage which (i) holds the uncut lens at a fixed position, (ii) moves to a desired location in accordance with a specific control information, and (iii) measures a current moving stage position and outputs information on the position; (3) forming an image of the uncut lens by an apparatus for image processing having a reference position set at a specific position relative to a reference position of the moving stage; (4) obtaining the hidden mark positions or the position of the edge of the segment of the uncut lens by processing the formed image; (5) obtaining a position outside a range of processing interference by information processing of data including (i) the obtained positions of the hidden marks or the obtained position of the edge of the segment, ii) the predetermined spectacle frame shape data and iii) lens holder-lens buildup area shape data, using a computer; (6) designating the obtained position as a new position for attaching the lens holder to the uncut lens, (the range of a processing interference being a portion of the lens holder-lens buildup area shape that extends beyond the shape of the spectacle frame so as to hinder processing of the uncut lens); (7) moving the uncut lens to a specific position in an apparatus for attaching a lens holder by the moving stage so that the lens holder can be attached at the designated new position on the uncut lens, the reference position of the moving stage and a general position for attaching the lens holder to the uncut lens being set in a specific relation in the apparatus for attaching a lens holder; and (8) attaching the lens holder to the uncut lens by the apparatus for attaching a lens holder.

This object and others are achieved in a third aspect of the present invention by providing an apparatus for attaching a lens holder to an uncut lens for a spectacle lens, comprising: (1) a lens holder that comprises a jig and is operably attached to an uncut lens and used as a central axis of rotation of the uncut lens in a process of grinding an edge of the uncut lens using an apparatus for processing spectacle lenses under numerical control based on processing data including spectacle frame shape data wherein the uncut lens is a progressive multifocal lens having a progressively changing dioptric power or a multifocal lens having a segment integrally formed on a main lens; (2) a computer; (3) a moving stage which holds the uncut lens at a fixed position, moves to a desired location in accordance with a specific control information from the computer, measures a current moving stage position and outputs the moving stage position information to the computer; (4) an apparatus for attaching a lens holder in which a reference position of the moving stage and a position for attaching the lens holder to the uncut lens are set in a specific relation; and (5), an apparatus for image processing which has a reference position set in specific relation to a reference position of the moving stage and which forms an image of the uncut lens and obtains the hidden marks positions or the position of the edge of the segment of the uncut lens by processing the formed image based on a command information of the computer; wherein the computer operably directs (i) obtaining a position outside a range of processing interference by information processing (a) mark position data or the position of the edge of the segment, (b) the spectacle frame shape data and c) lens holder overlap area shape data and designating the obtained position as a position for attaching the lens holder to the uncut lens, (ii) movement of the uncut lens to a specific position in an apparatus for attaching a lens holder by the moving stage so that the lens holder can be attached at the position for attaching the lens holder to the uncut lens, wherein the reference position of the moving stage and the new position for attaching the lens holder in the uncut lens are set in specific relation to the specific position in the apparatus for attaching a lens holder; and (iii) attachment of the lens holder to the uncut lens by the apparatus for attaching a lens holder.

In accordance with a fourth aspect of the invention, the embodiment in accordance with the third aspect of the invention is further modified so that the progressive multifocal lens has the hidden marks placed at specific positions relative to a reference position in the uncut lens, the reference position on the uncut lens being a position predetermined by a design of a layout based on a prescription, wherein the predetermined position is a position of a geometrical center or a position of an optical center.

In accordance with a fifth aspect of the invention, the embodiment in accordance with the third aspect of the invention is further modified so that the predetermined position is a position of a geometrical center or a position of an optical center, and the multifocal lens has a segment arranged on a main lens in a manner such that a position on an edge of the segment that forms a boundary between the main lens and the segment is placed in a specific relation to a reference position on the uncut lens, the uncut lens reference position being a position predetermined by a design of a layout based on a prescription and the predetermined position is a position of a geometrical center or a position of an optical center.

In accordance with the first aspect of the present invention, it is made possible for sure attachment of the lens holder at a determined position of a lens so as to eliminate processing interference even when the spectacle frame has a very small vertical dimension. In accordance with the second and third aspects of the present invention, the lens holder can be attached to a lens without processing interference in an automatic, sure and quick manner.

Further objects, features and advantages of the present invention will become apparent from the Detailed Description of Preferred Embodiments, which follows, when considered together with the attached Drawings.

DETAILED DESCRIPTION OF THE INVENTION

Figure 1:
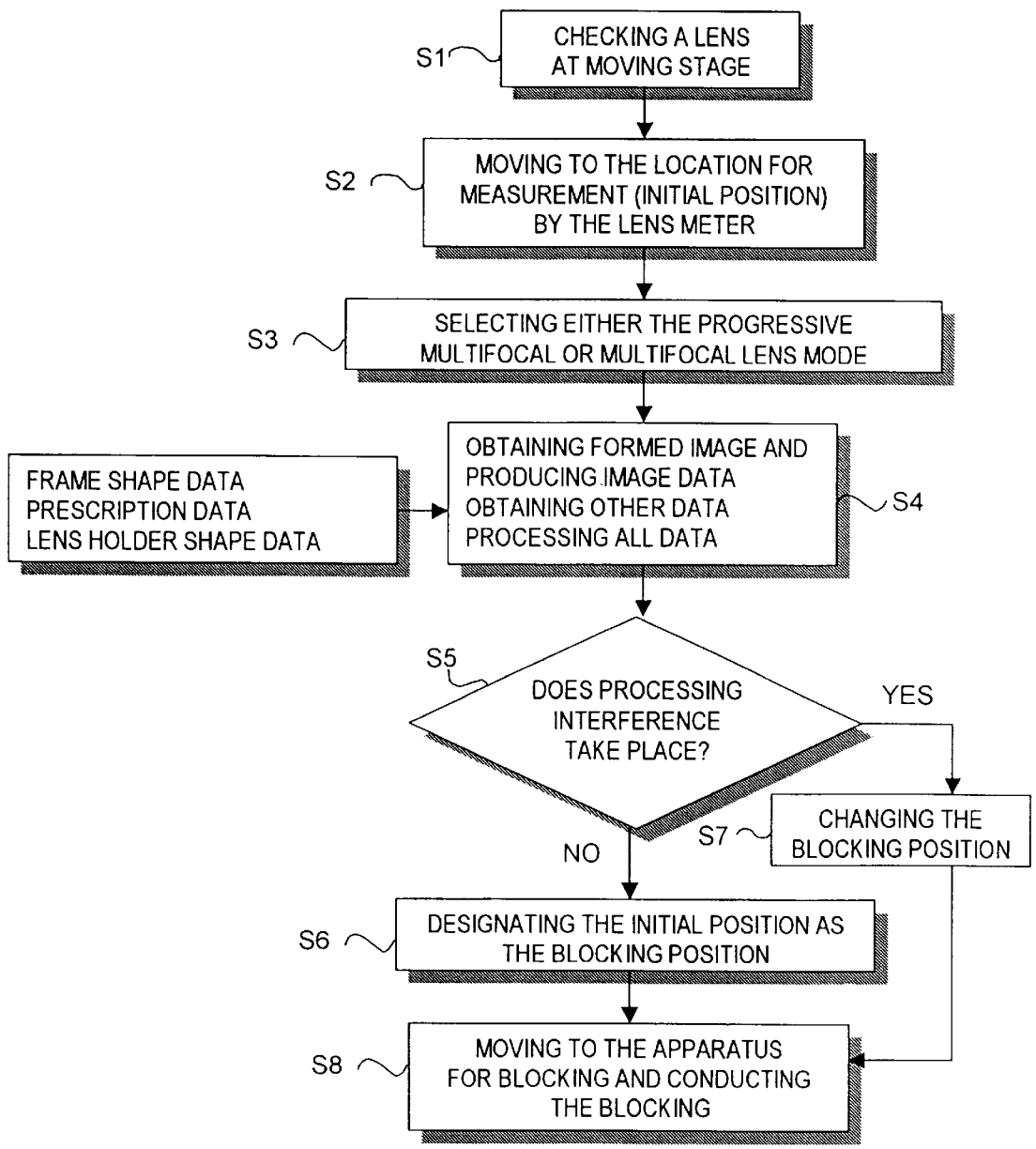
FIG. 1 is a diagram describing a method for attaching a lens holder to an uncut lens for a spectacle lens in accordance with the present invention.

As shown in FIG. 1, one embodiment of the method for attaching a lens holder to an uncut lens for a spectacle lens comprises steps S1 to S8. These steps essentially comprise movement of an uncut lens, calculating the position of the uncut lens and measuring the position of the uncut lens using a moving stage; measuring to form an image and image processing using a lens meter; and blocking of the lens using a blocking apparatus. (As used herein, blocking is defined as attachment of lens to a lens holder.) Therefore, the apparatus for attaching a lens holder to a spectacle lens comprising these apparatuses and a computer will be described first and the method for attaching a lens holder to an uncut lens for a spectacle lens will be described thereafter.

Figure 2:
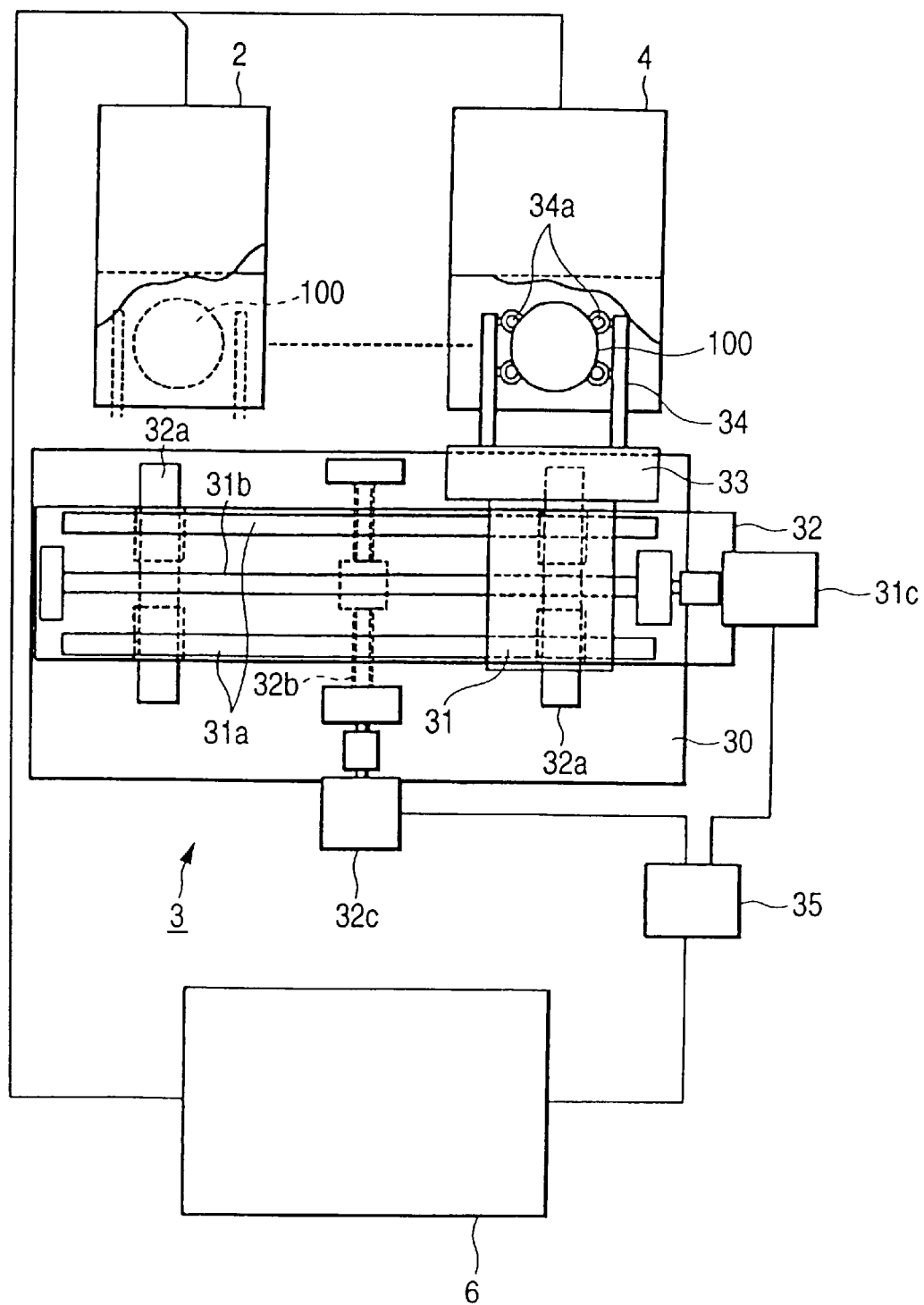
FIG. 2 is a diagram exhibiting the entire construction of an apparatus for attaching a lens holder to an uncut lens for a spectacle lens in accordance with the present invention.

As shown in FIG. 2, a blocking apparatus 2, a moving stage 3 and a lens meter 4 are connected to a computer 6 in a manner such that information can be exchanged with computer 6 and necessary controlling and information processing can be made by the computer 6. As will be more specifically described later, by the command of the computer 6, an uncut lens 100 is held by suction to sucking apparatuses 34a for holding a lens disposed in a lens holding portion 34 of the moving stage 3, and the uncut lens 100 is moved in a manner such that a specific position in the uncut lens 100 is brought either to the exact location for measurement by lens meter 4 or to the exact location for attachment by the blocking apparatus 2. Lens 100 is then fixed at the selected position. The information obtained by measuring these specific positions is sent to the computer 6. In the following embodiment, the measurements obtained using lens meter 4 and movement of the uncut lens 100 to the blocking apparatus 2 are conducted while the uncut lens 100 is held by suction at the suction apparatus 34 so that quick movements can be achieved. However, it is not always necessary that the operation be conducted as described above. For the measurement using lens meter 4, after the uncut lens is brought to a fixed location by the moving stage 3, the uncut lens may be fixed to a placing table disposed on the lens meter 4 and then temporarily released from holding by suction. After the measurement, the uncut lens may be held by suction again and moved.

When using the lens meter 4, optical properties such as the spherical dioptric power, the cylindrical dioptric power, the degree of cylinder axis and the prism value of the uncut lens 100 whether it be a multifocal lens (HR) and a bifocal lens (HN) are measured. In addition, an image of the uncut lens 100 is formed and the positions of hidden marks or the position of the edge of the segment is obtained by processing the formed image. Using the computer 6, the position for attaching the lens holder (the blocking position) is obtained by a prescribed processing of the data of the specific positions in the uncut lens 100, the data of the shape of the spectacle frame for the lens (obtained in advance), the data of prescription (the data of the layout) and the data of the shape of the lens holder.

Figure 3:
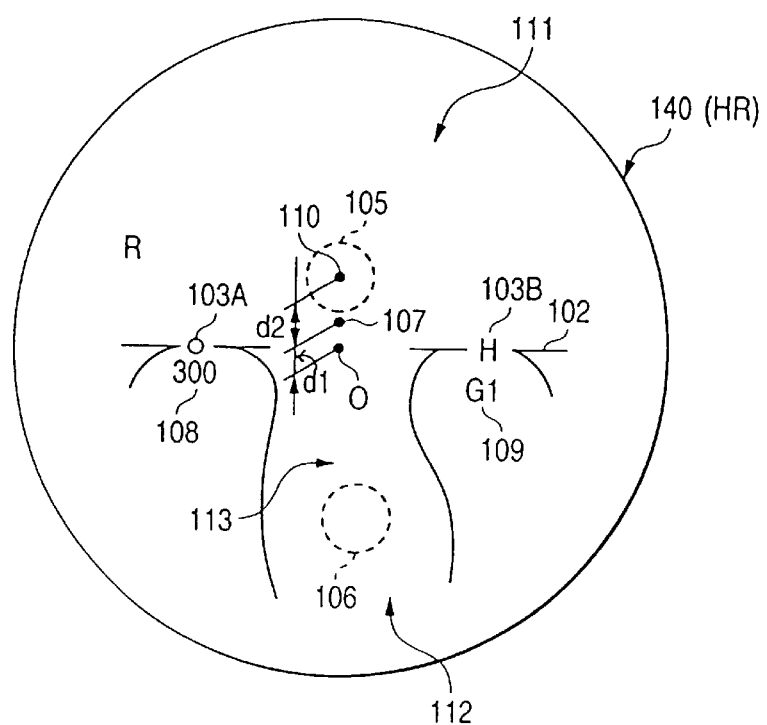
FIG. 3 is a diagram describing a progressive multifocal lens (HR).

A progressive multifocal lens (HR) 140 and a bifocal lens (a multifocal lens) (HN) 150 are described with reference to FIGS. 3 and 4 as follows. In FIG. 3, the progressive multifocal lens HR 140 has marks 103A and 103B, which are so-called hidden marks, exhibited at two positions separated from a geometric center O by the same distance (for example, 17 mm) along a horizontal reference line 102 which passes through the geometric center 0. The lens 140 (HR) is designed in a manner such that (1) the geometric center 0, (2) the optical center of the DDP lens portion 105 (used for measuring the distance dioptric power "DDP"), (3) the optical center of the NDP lens portion 106 (for measuring the near dioptric power ("NDP"), and (4) the position of the eyepoint 107 are obtained from the positions of the hidden marks 103A and 103B. Accordingly, the DDP portion 105 (used for measuring the distance dioptric power) is obtained from the positions of the hidden marks 103A and 103B so that the dioptric power (the distance dioptric power) can be measured.

The hidden marks 103A and 103B are shown either by small circles or, as shown in FIG. 3, by a small circle and a character. Below the hidden mark, is an additional dioptric power mark 108, which is a number designating the additional dioptric power of the lens HR (the difference between the outer vertex power of the distance portion and the outer vertex power of the near portion) and an identification mark 109 which exhibits the lens type (for example, G1), as shown. The additional dioptric power 108 is expressed by a three-digit number (for example, 300) below the hidden mark at the side of the ear when the spectacle glass is worn. Therefore, this mark 108 shows whether a spectacle lens is used for the left eye or the right eye, by knowing that a three-digit numbers is placed below the hidden mark at the left side or the right side of the lens, respectively. As seen by observing its front faces, the spectacle lens 111 shown in FIG. 3 is used for the right eye. The hidden mark at the left side 103A is exhibited as a small circle "○" and the hidden mark at the right side 103B is exhibited as the letter "H". Hidden marks 103A and 103B, additional dioptric power mark 108 and the identification mark 109 are formed on the convex surface of the lens HR as minute protrusions (about 2 to 4 $\mu$m) when the lens is produced by molding.

It is specified that the DDP lens portion 105, NDP lens portion 106 and the eyepoint 107 should be placed at reference positions separated from the geometric center O by specific distances although the reference positions may be different depending on the design of the lens HR. For example, the eyepoint 107 is placed at a position separated from the geometric center O by a specific distance d1 (for example, 2 mm) in the upward direction, and optical center 110 is placed at a position separated from the position of the eyepoint 107 by a specific distance d2 (for example, 4 mm) in the upward direction. Therefore, the positions of the geometric center 0, the eyepoint 107, and the optical center 110 can be obtained by forming images of hidden marks 103A and 103B and calculating the coordinates of these positions by processing the formed images. Lens portion b is for seeing distant things (a distance portion), portion 112 is for seeing near things (a near portion) and potion 113 is a portion in which the dioptric power continuously changes (a progressive portion).

Figure 4:
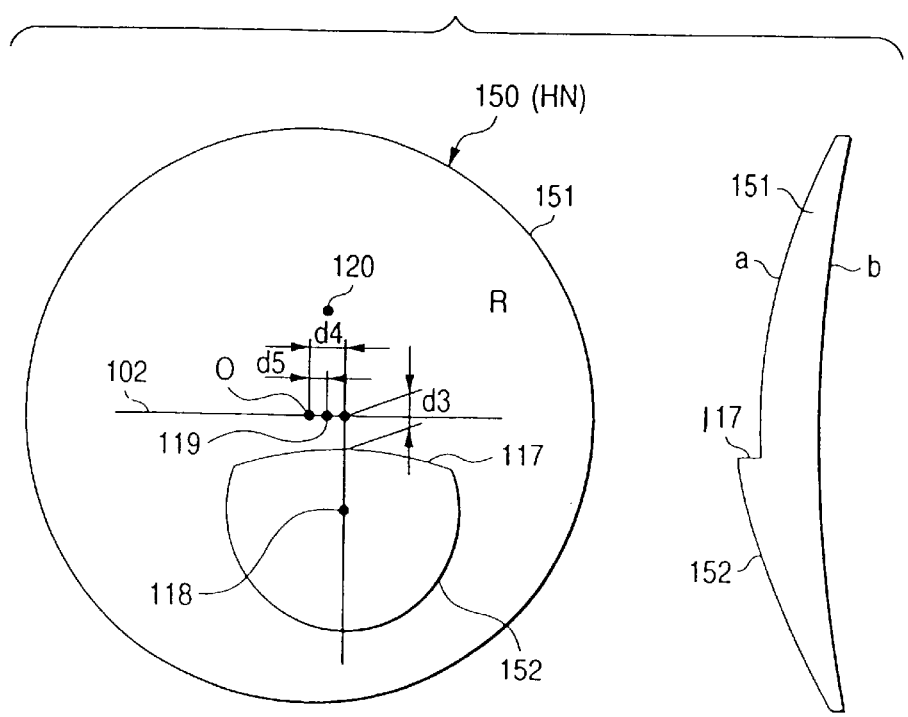
FIG. 4 is a diagram describing a multifocal lens (bifocal lens; HN).

In FIG. 4, the multifocal lens 150 has a main lens 151 and a segment 152 and is designed in a manner such that the positions of the geometric center O, the optical center 118 of the portion for measuring the near dioptric powder and the eyepoint 119 can be obtained using the upper edge 117 of the segment 152 as a reference mark, along with several known distances including, e.g., distances d3 and d4. Moreover, the dioptric power (the distance dioptric power) is measured after finding the position of the eyepoint 119 by referencing the position of the upper edge 117 of the segment 152.

When the lens is made of a plastic material, the segment 152 is formed in a shape protruded from the surface of the main lens 151 in a manner such that a side view shows a shape of a wedge. Upper edge 117 of segment 152 is formed at a position separated from horizontal reference line 102 (which passes through geometric center O) by a specific distance d3 for example, 5 mm) in the downward direction. When the spectacle lens is used for the right eye, the segment 152 is formed in a manner such that the optical center 118 of the portion for measuring the near dioptric power is separated from the geometric center O by a specific distance d4 (for example, 5 mm) in the rightward direction. The eyepoint 119 is fixed at a position separated from the geometric center O by a specific distance (for example, 2.5 mm) on the horizontal reference line 102 to the side of the segment 152. Therefore, the positions of the geometric center O and the eyepoint 119 can be obtained by (1) forming an image of the segment 152, (2) setting the upper edge 117 to be the edge of the segment 152 that forms the boundary between the main lens 150 and the segment 152, and (3) calculating the coordinates of the position of the center of this edge of segment 152 by image processing. Thus, upper edge 117 of the segment 152 is, in this case, analogous to the hidden marks 103A and 103B in the case of the progressive multifocal lens HR described above. Its position can be found whether the spectacle glass is used for the right eye or the left eye, as long as its respective left or right positioning with respect to the geometric center is known. The lens portion 120 is for measuring the distance dioptric power. FIG. 4 shows the concave side of a spectacle lens used for the right eye.

The construction of the lens meter 4 is described with reference to FIG. 5. The lens meter 4 comprises (1) an apparatus for forming and processing an image 440 (which is used for detecting the marks and calculating the position of the eyepoint), (2) an apparatus for measuring the distance dioptic power 441, and (3) an apparatus for measuring the height 442 which is used for measuring the height of the concave surface.

The apparatus for forming and processing an image 440 comprises (1) a light source 450 for illuminating a progressive multifocal lens (which is disposed above the position for detecting marks E1 and condenser lens 451), (2) a diaphragm 452, and (3) a half-mirror 453 (which is disposed in the light path between the light source 450 and the lens HR or the lens HN, whichever the case). The light source 450 is used for detecting marks of the progressive multifocal lens HR shown in FIG. 3. For example, a narrow wavelength, red light emitting LED is used so that sharp images of the hidden marks 103A and 103B, additional dioptric power mark 108, and the identification mark 109 can be obtained. As the half-mirror 453, a mirror having the ratio of the transmitted light and the reflected light of 7 to 3 is used.

The apparatus for forming and processing an image 440 first comprises (1) a switching means 454, (2) an image input device 458 such as CCD, (3) an image forming device 459, and (4) a lens for focus adjustment 460, all of which are disposed on the side of the convex surface of the lens HR (or the lens HN). Apparatus 440 also comprises (5) convergent lenses 461 and 462 which are fixed at a supporting cylinder 472, 6) an image formation lens 463, (7) a reflecting screen 464, and (8) light sources 465.

The switching means 454 comprises a shutter 455 and a driving apparatus 456, such as an air cylinder, for selectively inserting the shutter 455 into the light path between the half-mirror 453 and the apparatus for holding a lens 443. Switching means 454 is constructed to keep the shutter 455 outside the light path during detection of the marks and to insert the shutter 455 into the light path during the measurement of the dioptric power of the lens being examined. The switching means 454 is used so that outside light from the apparatus for forming and processing an image 440 does not enter into the image input device 458 through the half-mirror 453 during measurement of the dioptric power.

The lens for focus adjustment 460 is kept outside the light path during the detection of marks on the lens HR. During the detection of the position of the edge of the segment (the upper edge 117 of the segment 152 that is the mark for the lens HN), the lens for focus adjustment 460 is inserted into the light path between the half-mirror 453 and the image input device 458 and is used for focusing the image input device 458 on the convex surface a of the lens HN.

Figure 5:
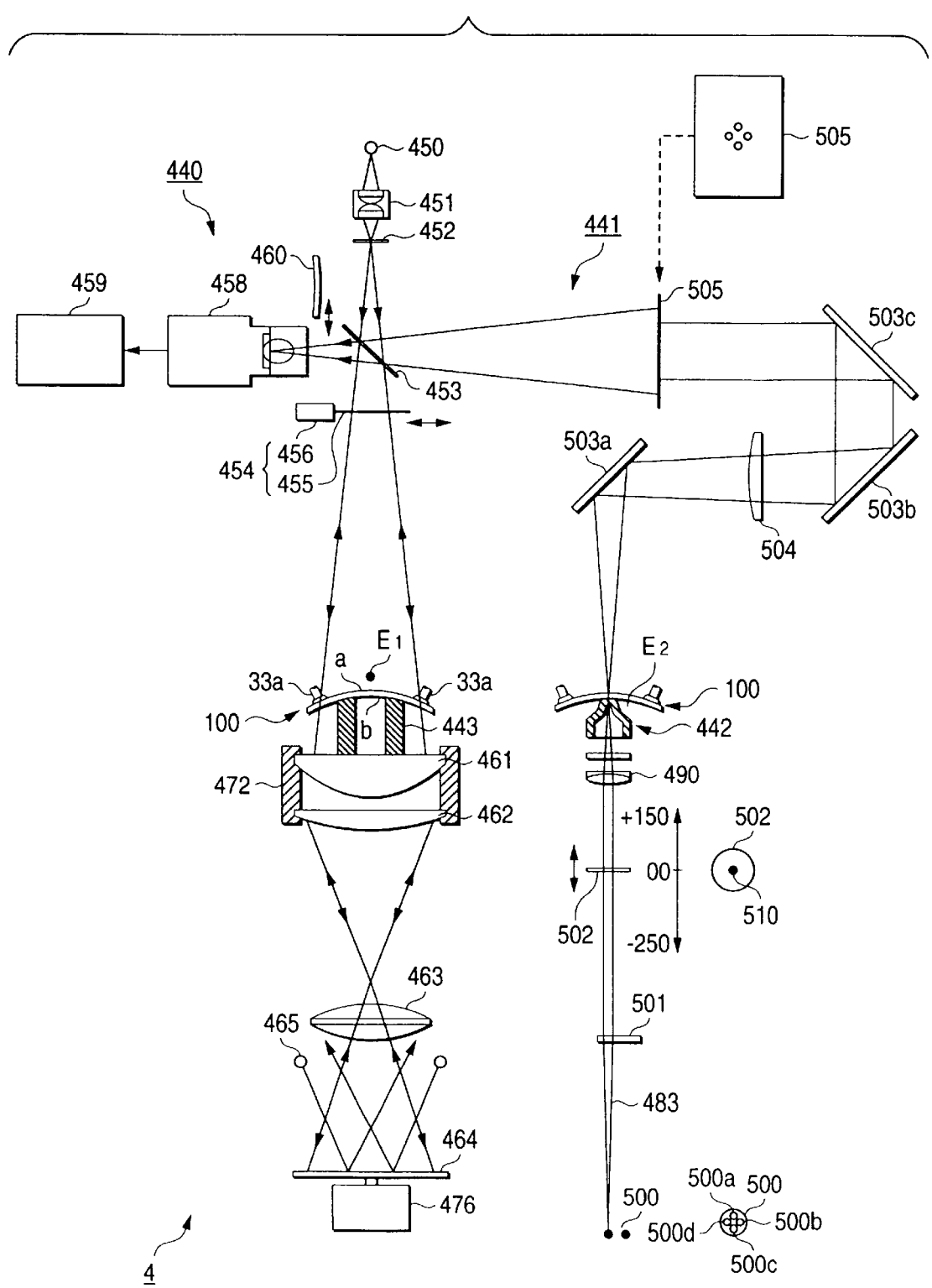
FIG. 5 is a diagram describing a lens meter.
Figure 6:
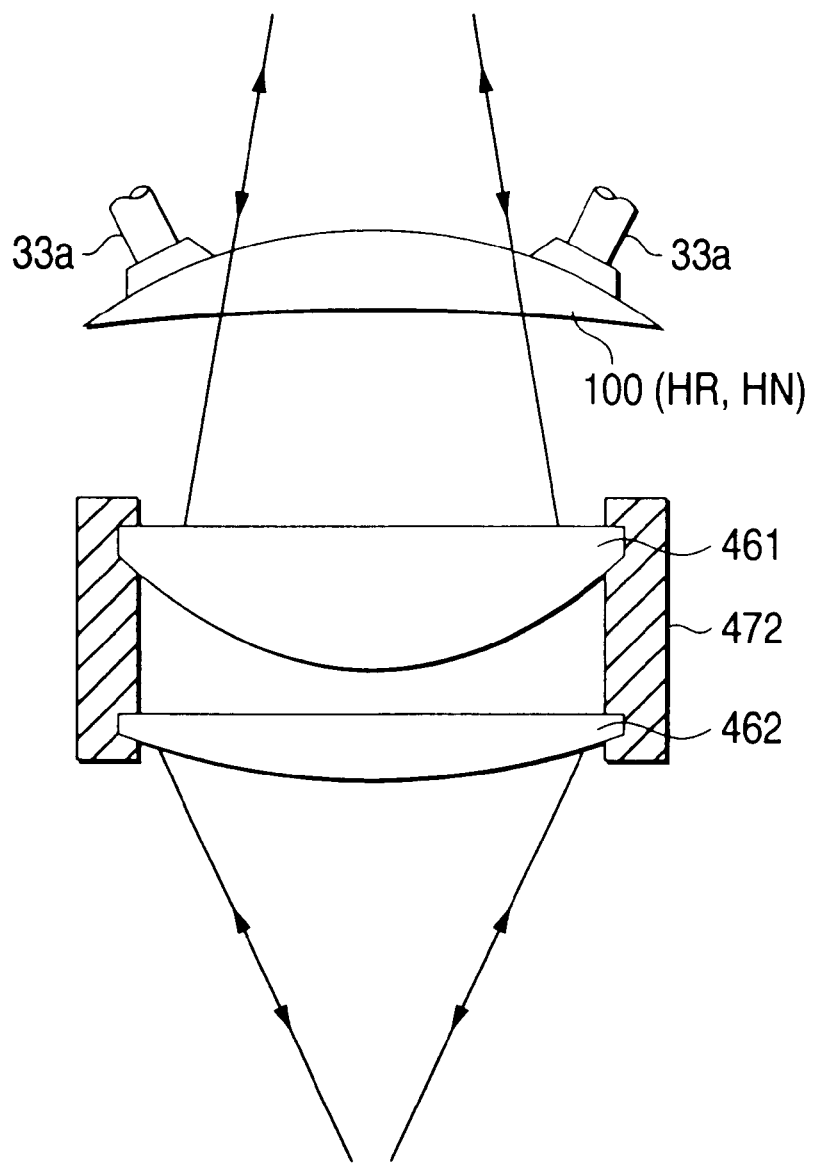
FIG. 6 is a partially expanded diagram describing input of an image of an uncut lens using a lens meter.

In FIG. 5, the image formation lens 463 comprises convex lenses. The rays of the image of the convex surface of a lens HR (or lens HN) converge through the convergent lenses 461 and 462 and form an image of the convex surface of lens HR (or lens HN) (having about the same size as the initial image) on the reflecting screen 464 through the image formation lens 463. It is noted that the image formation lens 463 is used as a light transfer lens when the spectacle lens is a multifocal lens HN.

Laminated on the reflecting screen 464 is a reflecting sheet having a laminated substrate coated with fine power, such as finely powdered glass and aluminum, to increase the reflectivity and enhance scattering of light. The screen is rotated at a high speed (for example, 3,400 rpm) by a motor 476 to make the lightness of the surface and background uniform, as the image of the convex surface of the lens HR (or lens HN) is reflected. The contrast between the portion of the hidden marks and portions other than the hidden marks is enhanced by this procedure. The rays of the image of the convex surface of the lens HR or the lens HN formed on the reflecting screen 464 are transferred back to the convex surface a of the lens HR or the lens HN via the same paths as those of the rays of incident light. These rays are then reflected by the half-mirror 453 to form an image on the light receiving surface of the image input device 458. The image thereby input is taken into the image forming device 459 and subjected to the image processing.

The light sources 465 are used for forming the image of the multifocal lens HN shown in FIG. 4. A red-light-emitting LED is used as the light source. A plurality of LED, e.g., eight LED's, are disposed at the same distance between each other in the circumferential direction along an outer circumference below the image formation lens 463. The rays emitted from the light sources 465 are reflected by the reflecting screen 464, pass through the image formation lens 463 and the convergent lenses 462 and 461 and then irradiate the concave surface b of the multifocal lens HN. The rays of the image of the convex surface of the lens HN are reflected at the half mirror 453, pass through the lens for focus adjustment 460, and form an image on the image input device 458. The multifocal lens HN is irradiated with rays from the light sources 465 on the concave surface b since the shadow of the upper edge 117 of the segment 152, i.e., the edge of the segment, is more clearly projected in comparison with the case in which the multifocal lens HN is irradiated on the convex surface a.

When, in the detection of the marks on the lens, the lens fixed by suction at the sucking apparatuses 34a is a progressive multifocal lens HR, the light source 450 for a progressive multifocal lens is lighted and the mark is detected while the switching means 454 and the lens for focus adjustment 460 are kept outside the light path of the apparatus for forming and processing an image 440. The light sources 465 are extinguished at this time.

When the light source 450 is lighted, the rays from the light source 450 irradiate the lens HR and produce rays of the image of the convex surface exhibiting the hidden marks 103A and 103B, images of additional dioptric power mark 108 and the identification mark 109, and these rays converge through the convergent lenses 461 and 462 and form an image of the convex surface of the lens HR on the reflecting screen 464 through the image formation lens 463. The rays of the image of the convex surface of the lens HR formed on the reflecting screen 464 are (1) reflected back to the convex surface a of the lens HR via the same paths as those of the rays of the incident light, and then reflected by the half-mirror 453 to form an image on the light receiving surface of the image input device 458. This image is input into the image forming device 459 for image processing. The hidden marks 103A and 103B, additional dioptric power mark 108 and the identification mark 109 are detected and the positions of the hidden marks 103A and 103B are calculated.

Whether a lens is used for the right eye or the left eye is determined by examining and calculating the position the additional dioptric power mark 108. The type of the lens is determined by the identification mark 109. The positions of the geometric center O and the eyepoint 107 (FIG. 3) are obtained by calculation based on the information of the positions of the hidden marks 103A and 103B. Based on (1) this lens information, (2) data about the shape of requisite spectacle frame, and (3) data about the prescription of the person who wears the glasses, the center of processing and the angle of attachment of the axis line of the lens holder 20 with respect to the lens HR, (which will be described later) are also determined.

When the lens is a multifocal lens HN, multifocal lens light sources 465 are used instead of progressive multifocal lens light source 450. A lens for focus adjustment 460 is inserted into the light path between the half mirror 453 and the image input device 458, and the image input device 458 is focused on the convex surface a of the lens HN. Light sources 465 produce rays which irradiate reflecting screen 464 and are reflected. The reflected rays pass through the image formation lens 463 and projection lenses 462 and 461 and irradiate the lens HN at the concave surface b. The rays of the image of the upper edge 117 of the segment 152 (formed on the convex surface a) are reflected by the half mirror 453 and brought to the image input device 458. The image input into the image input device 458 is transferred to the image-forming device 459 and subjected to image processing. The upper edge 117 is detected and the position of the upper edge 117 is calculated.

Based on information about the position of upper edge 117, the positions of geometric center O and eyepoint 119 are calculated (FIG. 4). Based on obtained information of the lens, as well as data regarding the shape of the spectacle frame and data of the prescription of the person who wears the spectacle glasses, the center of processing and the angle of attachment of the axis line of the lens holder 20 with respect to the lens HN are determined.

As described above, when the light source for the progressive multifocal lens 450 and the image input device 458 are disposed at the side of the convex surface a of lens HR (or the lens HN) and the image of the convex surface of the lens HR is formed, strain of the image due to the cylindrical axis is not formed even when the lens HR has a cylindrical dioptric power and an excellent image can be obtained by projecting the image of the convex surface of the lens HR on the reflecting screen 464 disposed at the side of the concave surface b and bringing the image reflected by the reflecting screen 464 back to the side of the convex surface a of the lens HR and then to the image input device 458. In other words, when the rays irradiate the convex surface a, strains are formed in the image of the surface of the convex surface while passing through the lens HR due to the cylindrical axis, and the strained image is projected to the reflecting screen 464. However, since the strained image returns to the side of the convex surface a through the lens HR after the image is reflected by the reflecting screen 464, the image is strained again by the cylindrical axis. The strain in the image formed in the path to the reflecting screen 464 is cancelled due to the strain formed in the path after being reflected. Therefore, the unstrained image is formed on the light-receiving surface of the image input device 458 so that image processing can be conducted by the image forming device 459 easily without complicated corrections.

When the lens is a multifocal lens HN, the light irradiates the spectacle lens at the concave surface and the image of the upper edge 117 of the segment 152 on the convex surface is directly formed in the image input device 458. The formed image does not have strain due to the cylindrical axis, and an excellent image can be obtained. Therefore, image processing can be conducted easily in this case, also.

When the detection of the marks on the uncut lens 100 is completed, the uncut lens 100 is transferred to a location for measuring its height and dioptric power E2 while the uncut lens is held by the sucking apparatuses 34a. Here, the height of the concave surface b and the distance dioptric power of the lens HR or the lens HN are measured.

In FIG. 5, an apparatus 442 for measuring the height of the concave surface b of the lens HR (or the lens HN) is disposed at the position for measuring the height and the dioptric power E2. The apparatus 442 for measuring the height comprises: (1) light source 500 (which is disposed below the position for measuring the height and the dioptric power E2 and irradiates the lens HR or the lens HN at the concave surface b), (2) a light transfer lens 501 (which arranges the rays 483 irradiated from the light source 500 into parallel rays), (3) a collimator lens 490 (which forms the image of the light source on the concave surface b of the lens HN), and (4) a target 502 (which is disposed between the collimator lens 490 and the light transfer lens 501 and can be moved freely in the direction of the optical axis.)

Three mirrors 503a, 503b and 503c, an object lens 504, and a transmitting screen 505 are disposed at the side of the convex surface a of the lens HR or the lens HN. In the present embodiment, since the lens for the examination is either a progressive multifocal lens NR or a multifocal lens HN as described above, the distance dioptric power of the lens is measured. The range of measurement of the dioptric power of a lens by the apparatus for measuring the distance dioptic power 441 is, for example, −20D to +15D.

The light source 500 is composed of four light emitting diodes (LED) 500a, 500b, 500c and 500d, each having high luminance. The light emitting diodes are arranged at apices of a square the center of which is at the optical axis so that calculation is facilitated. As the target 502, a pinhole plate having a pinhole 510 having a diameter of about 1 mmφ at the center is used. The image of the pinhole 510 is formed on the transmitting screen 505 as a pattern image of the target 502 by the action of the collimator lens 490 and the object lens 504.

The object lens 504 is disposed between the mirror 503a and the mirror 503b. The transmitting screen 505 is composed of a plate of milk white synthetic resin or ground glass and is disposed in a manner such that the transmitting screen 505 and the image input device 458 of the apparatus for forming and processing an image 440 face to each other through the half mirror 453 placed between them.

When the distance dioptric power of the lens HR (or lens HN) is measured, the lens for focus adjustment 460 is removed to outside of the light path and the switching means 454 is inserted into the light path. The light sources 450 and 465 are extinguished. The light source 500 is lighted when the examination lens is not in position for measuring lens height and dioptric power E2. When the light source 500 is lighted, the emitted rays 483 are arranged into parallel rays by the light transfer lens 501, irradiate the pinhole plate 502 and reach the collimator lens 490. After passing the collimator 490, the rays converge at the position of the concave surface b of the lens HR or the lens HN and form an image of the light source. Then, the rays become divergent again, pass the object lens 504, and irradiate the transmitting screen 505.

When the effect of the dioptric power of the spectacle lens is absent (0.00D) in the formation of the image of the pinhole 510 of the pinhole plate 502 on the transmitting screen 505, the rays of the image of the pinhole 510 of the pinhole plate 502 are arranged into parallel rays by the collimator lens 490 and the image of the pinhole 510 is formed on the transmitting screen 505 by the action of the object lens 504. In other words, when LED's 500a to 500d are each successively lighted in the absence of the lens HR (or the lens HN) light 483 passes through (1) the light transfer lens 501, (2) the pinhole 510 of the pinhole plate 502, (3) the collimator lens 490, (4) the mirror 503a, (5) the object lens 504, (6) the mirror 503b and (7) the mirror 503c, successively, and the image of the pinhole is formed on the transmitting screen 505. At this time, the pinhole plate 502 is kept at the reference position so that the images of the pinhole formed by lighting each of LED's 500a to 500d successively, are kept approximately at the same position.

The rays of the image of the pinhole projected on the transmitting screen 505 pass through the transmitting screen 505 and the half mirror 453 and are input as an image into the image input device 458. By forming the image of the pinhole and subjecting the image to the image processing by the image-forming device 459, the position of the image of the pinhole is calculated and memorized as the reference position. When the lens to be examined is placed in the path of the light, the images of the pinhole of the pinhole plate 502 formed by lighting each of the LED's 500a to 500d successively, are not kept approximately at the same position of the transmitting screen 505. Therefore, the lens meter has a mechanism for moving the pinhole plate 502 in the direction of the optical axis and adjusting the position of the pinhole plate so that the images are formed at approximately the same position, similarly to conventional lens meters.

When the distance dioptric power of the lens for examination is measured, the lens for examination is placed on the apparatus for measuring the height 442. Based on the information on the height of the concave surface b obtained and collected by the apparatus for measuring the height 442, the "Z" (or vertically moving) stage 33 FIG. 2) is driven under control and the portion for measuring the distance dioptric power on the concave surface b of the lens examined is brought to the specific reference height of the measurement. The reference height of the measurement is the focus position of the collimator lens 490. When the portion for measuring the distance dioptric power on the concave surface b of the examined lens is brought to the specific reference height of the measurement, the measurement of the dioptric power (the distance dioptric power) is conducted. The measurement of the dioptric power is conducted while each of the LEDs 500a to 500d are successively lighted.

Since the light 483 from LEDs 500a to 500d passes through the examined lens, the position of the pinhole image formed by each of the LED's projected on the transmitting screen 505 shifts from the reference position described above due to a prism effect which depends on the dioptric power of the examined lens. The pinhole image is input into the image input device 458 and the obtained image processed by the image-forming device 459. The amount of the shift of the pinhole image is calculated with respect to each of the LEDs 500a to 500d. In other words, the image of the pinhole is formed at about the same position on the transmitting screen 505 by moving and adjusting the position of the pinhole plate 502. The amount of movement of the pinhole plate 502 is memorized by the image-forming device 459 and the dioptric power of the lens HR or the lens HN is calculated by converting (1) the amount of shift of the image of the pinhole and (2) the amount of movement of the pinhole plate into the dioptric power. The basic method of calculation of the dioptric power is described in detail in Japanese Patent Application Laid-Open No. Heisei 2(1990)-216428 by the applicant of the present invention, hereby incorporated herein by reference.

Figure 7:
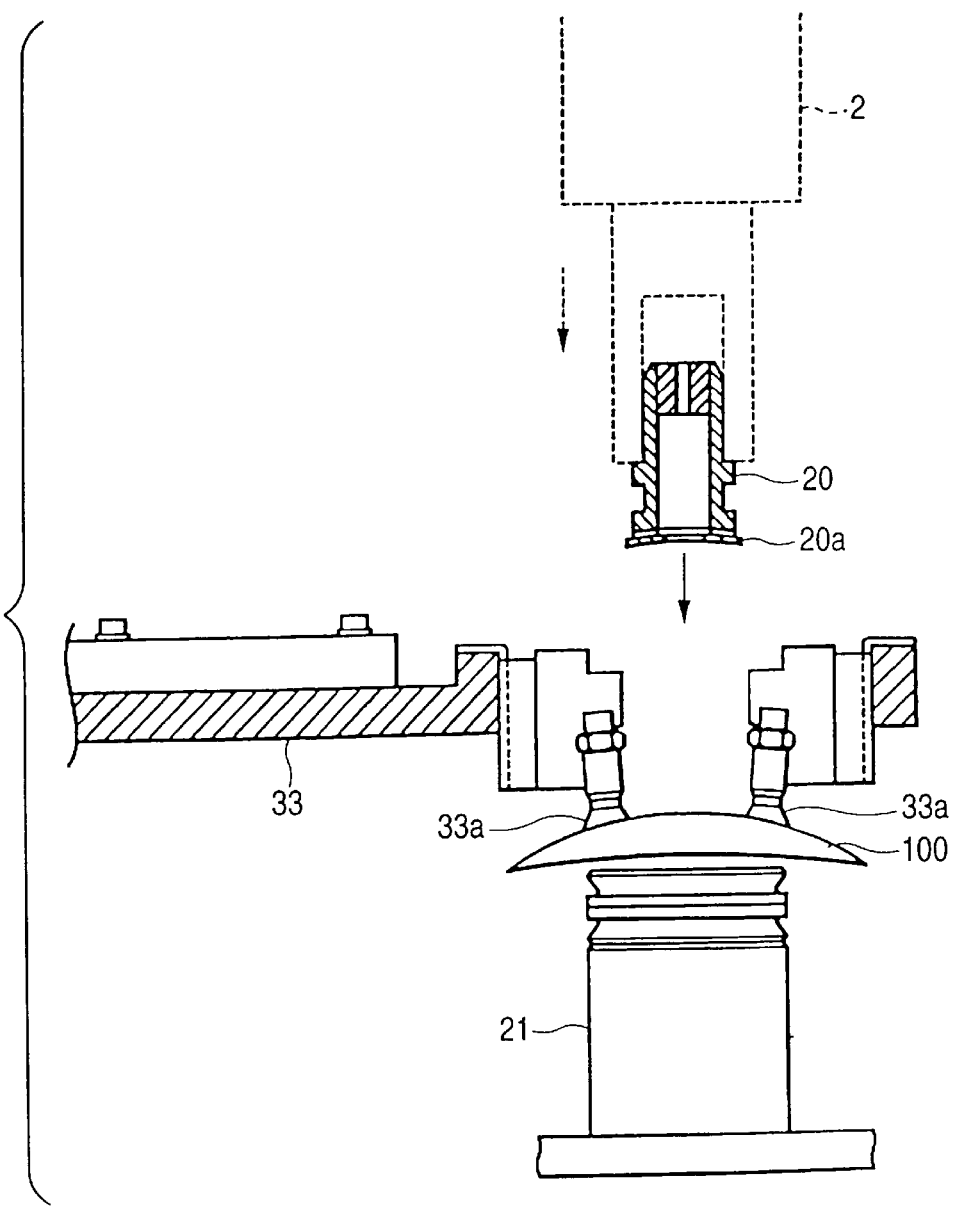
FIG. 7 is a diagram describing attachment of a lens holder to an uncut lens using a lens blocking apparatus.
Figure 8:
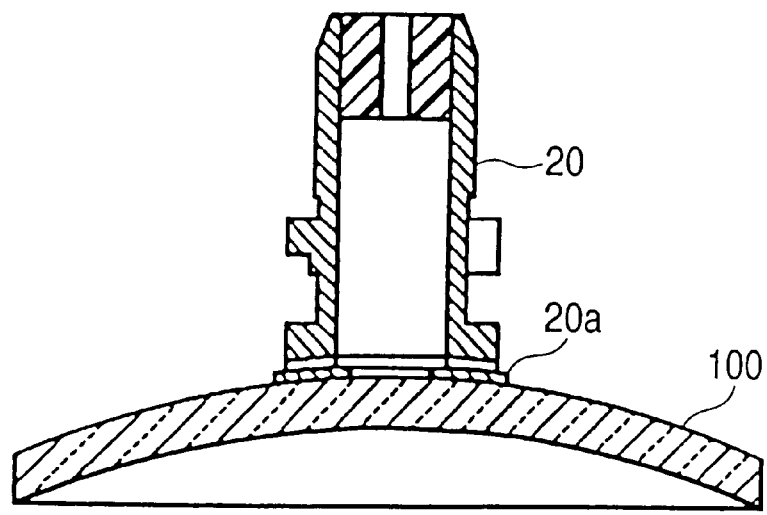
FIG. 8 is a diagram exhibiting a lens holder attached to an uncut lens.

The blocking apparatus 2 is described as follows. As shown in FIGS. 2, 7 and 8, the blocking apparatus 2 is a conventional apparatus which supports a lens holder 20 and pushes the lens holder 20 to the surface of the uncut lens 100 via an elastic seal 20a to attach the lens holder thereto. The uncut lens 100 is held by the lens holding portion 33 of the moving stage 3 and is placed on the lens placement table 21 at a position fixed in a manner such that the central axis of the lens holder 20 is placed exactly in line with the position for attachment on the uncut lens 100. Then, the lens holder 20 is attached to the uncut lens.

In response to command from the computer 6, the moving stage 3 holds the uncut lens 100 by suction using sucking apparatuses 34a for holding a lens (which are disposed at the lens holding portion 34). The moving stage 3 controls the lens position by moving the uncut lens and bringing specific positions on the uncut lens 100 exactly in line with the position of measurement by lens meter 4 or exactly in line with the position of attachment to the blocking apparatus 2. The X-Y table also has the function of transmitting information on the positions to the computer 6.

The lens holding portion 34 is attached to a Z stage 33. The Z stage 33 is constructed in a manner such that the Z stage can be moved in the vertical direction (in the direction of the Z axis) together with the lens holding portion 34 held by the Z stage 33 by a conventional mechanism for vertical movement (not shown in FIGS. 7 and 8). The Z stage 33 is attached to an X stage 31. The X stage 31 is disposed on a Y stage 32 in a manner such that the X stage can move freely in the X-direction on two rails 31a disposed on the Y stage 32. The movement of the X stage is controlled by rotating a screw shaft 31b by a driving pulse motor 31c. The screw shaft 31b is screwed into the X stage 31 and attached to the Y stage 32 in a manner such that the screw shaft 31b can freely rotate.

The Y stage 32 is disposed on a base table 30 in a manner such that the Y stage can freely move in the Y-direction on two rails 32a disposed on the base table 30. The movement of the Y stage is controlled by rotating a screw shaft 32b by a driving pulse motor 32c. The screw shaft 32b is screwed into the Y stage 32 and attached to the base table 30 in a manner such that the screw shaft 32b can freely rotate. The X motor 31c and the Y motor 32c are connected to the computer 6 via a controller 35.

The computer 6 controls the lens meter 4, the blocking apparatus 2 and the moving stage 3 by (1) transmitting necessary control signals, (2) processing information such as image processing data of positions transmitted from these apparatuses, spectacle frame shape data (which are obtained by an apparatus for measuring the shape of the spectacle frame (not shown in FIGS. 7 and 8) or provided as input data), data of the shape of the lens holder, prescription data (layout) and other information, (3) determines the position for attaching the lens holder and further (4) provides necessary controls to the above apparatuses based on the results. Specifically, the computer controls the apparatuses so that the following steps S1 to S8 are performed as shown in FIG. 1.

(Steps S1 to S2)

An uncut lens 100 supplied from an apparatus for supplying an uncut lens (not shown in FIG. 1) is held by the sucking apparatuses 34a of the lens holding portion 34 of the moving stage 3 (S1). The lens is moved to the location for measurement by lens meter 4 and fixed at a position such that the reference position of the lens meter 4 is brought to an initial position of the uncut lens 100 (S2). A position approximately at the center of the uncut lens (the round lens) is selected as the initial position since, when the uncut lens transferred by the apparatus for supplying an uncut lens (not shown in FIG. 1) is held by the sucking apparatuses 34a of the lens holding portion 34 moving stage 3, the above position can be easily indicated and controlled as the position of holding.

(Step S3)

61 The mode of measurement by the lens meter is selected in accordance with the type of uncut lens examined, that is, either a progressive multifocal lens (HR) or a multifocal lens (HN) (S3).

(Step S4)

An image of the uncut lens is input into the lens meter 4. Data of the obtained image is subjected to image processing and the positions of the hidden marks or the position of the edge of the segment is obtained. Information processing is conducted using the data obtained by the above image processing, the data of the shape of the spectacle frame (obtained by an apparatus for measuring the shape of the spectacle frame (not shown in FIG. 1) or provided as input data), the data of the shape of the lens holder, the data of the prescription (layout), and the like. The initial position described above is specified in relation to the optical or geometrical reference position of the shape of the spectacle frame. In this step, the thickness and the dioptric power are measured by the lens meter 4.

(Step S5)

In this step, apparatus estimates whether processing interference will occur during lens holder blocking (attachment) to the lens at this initial position. In other words, it is estimated whether processing interference will take place under the assumption that the lens holder would be blocked to the lens at the initial position by using the data of the shape of the spectacle frame, the data of the prescription and the data of the shape (the diameter) of the lens holder.

(Steps S6 to S8)

When it is estimated in Step 5 that processing interference would not take place, the initial position is used as the blocking position (S6). When it is estimated in Step 5 that processing interference would take place, the blocking position is changed (S7). Then, the uncut lens is moved to the apparatus for blocking and the blocking is conducted (S8). For changing the blocking position, when the initial position is approximately at the center (the optical center) of the uncut lens (the round lens), the blocking position is changed to a new position approximately at the geometrical center (or alternately to an otherwise desirable new position where processing interference will not take place) and necessary conditions as the center of processing are satisfied.

In accordance with the above description of embodiments of the apparatus for and method of attaching a lens holder to an uncut lens for a spectacle lens, the lens holder can surely be attached to a position to avoid processing interference, even when the spectacle frame has a remarkably small vertical dimension. Quick operation can be achieved since the formation of the images and the measurement of the dioptric power by the lens meter and the operations of blocking by the blocking apparatus are conducted while the uncut lens is held by the sucking apparatuses on the moving stage.

As described above, the present invention is characterized in that the lens holder can be attached to the uncut lens at a position set at the outside of the range of processing interference when (1) the positions of the hidden marks or the position of the edge of the segment is obtained by forming and processing the image of the uncut lens by the apparatus for image processing, (2) the obtained positions of the hidden marks or the position of the edge of the segment, the data of the spectacle frame obtained in advance and the data of the shape of the lens holder completed spectacle lens overlay area are processed and (3) the lens holder is attached to the uncut lens. The range of processing interference is where processing interference takes place, i.e., the range where a portion of the shape of area of the lens holder extends beyond the shape of the spectacle frame so that the uncut lens cannot be processed. Thus, a position outside the range of processing interference is efficiently obtained so that the lens holder can be attached to the uncut lens when the lens holder is attached to a progressive multifocal lens or a multifocal lens.

While the present invention has been illustrated by means of certain preferred embodiments, one of ordinary skill in the art will recognize that additions, deletions, substitutions, modifications and improvements can be made while remaining within the scope and spirit of the present invention, as determined by the appended claims.

We claim:

1. A method for attaching a lens holder to an uncut lens for a spectacle lens, in a process for grinding an edge of the uncut lens using an apparatus for processing spectacle lenses under numerical control based on processing data including spectacle frame shape data, comprising the steps of:

providing a lens holder comprising a jig operably attached to an uncut lens and defining a central axis of rotation of the uncut lens;

forming an image of the uncut lens by an apparatus for image processing and obtaining one or both of (1) positions of hidden marks, placed at specific positions relative to a first reference position on the uncut lens, wherein the first reference position is predetermined by a design of a layout corresponding to prescription data and (2) a position of the edge of a segment, placed at a specific position relative to the first reference position on the uncut lens, wherein the first reference position is predetermined by the design of the layout corresponding to prescription data by processing the formed image; and obtaining a position outside of a range of processing interference by information processing of (1) data of positions of the hidden marks or the position of the edge of the segment, (2) the first reference position, (3) spectacle frame shape data and (4) lens holder-lens buildup area shape data, using a computer;

designating the obtained position as a position for attaching the lens holder to the uncut lens; and attaching the lens holder at the obtained position;

wherein the range of a processing interference is a range where a portion of the lens holder extends beyond the shape of the spectacle frame so as to hinder processing of the uncut lens, and wherein the uncut lens is either a progressive multifocal lens having a progressively changing dioptric power or a multifocal lens having a segment integrally formed on a main lens of the uncut lens.

2. The method according to claim 1, wherein the uncut lens is the progressive multifocal lens having progressively changing dioptric power and has hidden marks placed thereon at specific positions relative to the first reference position on the uncut lens, wherein the first reference position is a position predetermined by the design of the layout based on the prescription.

3. The method of claim 2, wherein said first reference position is a position of a geometrical center or a position of an optical center.

4. The method according to claim 1, wherein the uncut lens is a progressive multifocal lens.

5. The method according to claim 1, wherein the uncut lens is a multifocal lens having a segment integrally formed on a main lens of the uncut lens.

6. The method according to claim 2, further comprising the step of obtaining positions of a geometric center, an eyepoint, and an optical center of the progressive multifocal lens using the positions of the hidden marks to calculate the positions of the geometric center, the eyepoint, and the optical center.

7. The method according to claim 1, wherein the uncut lens is the multifocal lens having a segment integrally formed on the main lens of the uncut lens and the uncut lens has a segment arranged on the main lens in a manner such that a position on an edge of the segment, said edge of the segment forming a boundary between the main lens and the segment, is in a specific relation to the first reference position on the uncut lens, wherein the first reference position is a position predetermined by the design of the layout based on the prescription.

8. The method of claim 7, wherein said first reference position is a position of a geometrical center or a position of an optical center.

9. The method according to claim 7, further comprising the step of obtaining positions of a geometric center, an eyepoint, and an optical center for a portion for measuring the near dioptric power of the multifocal lens by using the position of the edge of the segment to calculate the positions of the geometric center, the eyepoint, and the optical center for the portion for measuring the near dioptric power.

10. A method for producing a progressive multifocal lens comprising the steps according to the method of claim 1, and further comprising the step of processing the lens.

11. A method for producing a multifocal lens comprising the steps according to the method of claim 1, and further comprising the step of processing the lens.

12. A method for attaching a lens holder to an uncut lens for a spectacle lens, in a process for grinding an edge of the uncut lens using an apparatus for processing spectacle lenses under numerical control based on processing data including predetermined spectacle frame shape data, comprising the steps of:

providing a lens holder comprising a jig attached to an uncut lens and defining a central axis of rotation of the uncut lens;

fixing the uncut lens to a moving stage that (1) holds the uncut lens at a fixed position, (2) moves to a desired location in accordance with specific control information, and (3) measures a current moving stage position and outputs information about the measured position;

forming an image of the uncut lens by an apparatus for image processing having a reference position set at a specific position relative to a reference position of the moving stage;

obtaining (1) hidden marks positions, which are placed at specific positions relative to a first reference position on the uncut lens, wherein the first reference position is predetermined by a design of a layout corresponding to prescription data or (2) a position of the edge of a segment, which is placed at a specific position relative to the first reference position on the uncut lens, wherein the first reference position is predetermined by the design of the layout corresponding to prescription data, by processing the formed image;

obtaining a position outside a range of processing interference by information processing of data including (1) the obtained positions of the hidden marks or the obtained position of the edge of the segment, (2) the first reference position, (3) the predetermined spectacle frame shape data and (4) lens holder lens buildup area shape data, using a computer;

designating the obtained position as a new position for attaching the lens holder to the uncut lens;

moving the uncut lens to a specific position in an apparatus for attaching a lens holder by the moving stage so that the lens holder can be attached at the designated new position on the uncut lens, the reference position of the moving stage and general position for attaching the lens holder to the uncut lens being set in a specific relation in the apparatus for attaching a lens holder; and attaching the lens holder to the uncut lens by the apparatus for attaching a lens holder, wherein the uncut lens is either a progressive multifocal lens having a progressively changing dioptric power, or a multifocal lens having a segment integrally formed on a main lens of the uncut lens.

13. The method according to claim 12, wherein the progressive multifocal lens has hidden marks placed thereon at specific positions relative to the first reference position on the uncut lens, wherein the first reference position is a position which is determined in advance by the design of the layout based on the prescription.

14. The method of claim 13, wherein said first reference position is a position of a geometrical center or a position of an optical center.

15. The method according to claim 12, wherein the multifocal lens has the segment arranged on the main lens in a manner such that a position of an edge of the segment that is a boundary of the main lens and the segment is placed at a specific position relative to the first reference position in a shape of the spectacle lens, the first reference position being a position determined in advance by the design of the layout based on the prescription.

16. The method of claim 15, wherein said first reference position is a position of a geometrical center off a position of an optical center.

17. A method for producing a progressive multifocal lens comprising the steps according to the method of claim 12, and further comprising the step of processing the lens.

18. An apparatus for attaching a lens holder to an uncut lens for a spectacle lens, in a process of grinding an edge of the uncut lens using an apparatus for processing spectacle lenses under numerical control based on processing data including spectacle frame shape data wherein the uncut lens is a progressive multifocal lens having a progressively changing dioptric power or a multifocal lens having a segment integrally formed on a main lens, comprising:

- a. a lens holder that comprises a jig that is operably attached to an uncut lens and used as a central axis of rotation of the uncut lens;
- b. a computer;
- c. a moving stage that holds the uncut lens at a fixed position, moves to a desired location in accordance with a specific control information from the computer, measures a current moving stage position and outputs the moving stage position information to the computer;
- d. an apparatus for attaching a lens holder in which a reference position of the moving stage and a position for attaching the lens holder to the uncut lens are set in a specific relation; and
- e. an apparatus for image processing which has a reference position set in a specific relation to a reference position of the moving stage and which forms an image of the uncut lens and obtains hidden mark positions or a position of an edge of the segment of the uncut lens by processing the formed image based on a command information from the computer; wherein the computer operably directs the steps of 1. obtaining a position outside a range of processing interference by information processing (a) mark position data or a position of the edge of the segment, (b) the reference position, (c) the spectacle frame shape data and (d) lens holder overlap area shape data, and designating the obtained position as a position for attaching the lens holder in the uncut lens,
2. moving the uncut lens to a specific position in an apparatus for attaching a lens holder by the moving stage so that the lens holder can be attached at the new position for attaching the lens holder to the uncut lens, wherein the reference position of the moving stage and the new position for attaching the lens holder to the uncut lens are set in specific relation to the specific position in the apparatus for attaching a lens holder; and
3. attaching the lens holder to the uncut lens by the apparatus for attaching a lens holder.

19. The apparatus according claim 18, wherein the progressive multifocal lens has said hidden marks placed at specific positions relative to a reference position in the uncut lens, the reference position on the uncut lens being a position predetermined by a design of a layout based on a prescription, wherein the predetermined position is a position of a geometrical center or a position of an optical center.

20. The apparatus according claim 18 wherein the predetermined position is a position of a geometrical center or a position of an optical center, and the multifocal lens has a segment arranged on a main lens in a manner such that a position on an edge of the segment that forms a boundary between the main lens and the segment is placed in a specific relation to a reference position on the uncut lens, the uncut lens reference position being a position predetermined by a design of a layout based on a prescription and the predetermined position is a position of a geometrical center or a position of an optical center.

* * * * *